Feb. 24, 1953

P. E. LUTHER 2,629,416

FRUIT PITTING MECHANISM

Filed June 17, 1949

INVENTOR.
PAUL E. LUTHER

BY
Boyken, Mohler & Beckley
ATTORNEYS

Feb. 24, 1953 P. E. LUTHER 2,629,416
FRUIT PITTING MECHANISM
Filed June 17, 1949 7 Sheets-Sheet 2

INVENTOR.
PAUL E. LUTHER
BY
Boyken, Mohler & Beckley
ATTORNEYS

Feb. 24, 1953     P. E. LUTHER     2,629,416
FRUIT PITTING MECHANISM

Filed June 17, 1949     7 Sheets-Sheet 4

INVENTOR.
PAUL E. LUTHER
BY
Boyken, Mohler & Beckley
ATTORNEYS

Feb. 24, 1953 P. E. LUTHER 2,629,416
FRUIT PITTING MECHANISM
Filed June 17, 1949 7 Sheets-Sheet 5

INVENTOR.
PAUL E. LUTHER
BY
Boyken, Mohler & Beckley
ATTORNEYS

Patented Feb. 24, 1953

2,629,416

UNITED STATES PATENT OFFICE 2,629,416

FRUIT PITTING MECHANISM

Paul E. Luther, Oakland, Calif., assignor, by mesne assignments, to Fruit Machinery Company, Berkeley, Calif., a corporation of Nevada Application June 17, 1949, Serial No. 99,601

5 Claims. (Cl. 146—28)

This invention relates to a machine for pitting fruit and more particularly to an improved mechanism for pitting fruit without destroying or tearing the flesh surrounding the pit.

In an application for U. S. Letters Patent entitled, "Fruit Splitter and Pitter," Serial No. 779,594, filed October 13, 1947, by Theodore M. Harrer, there is described a machine for splitting and pitting fruit. The present invention is an improvement on the pitting mechanism of the type therein generally described.

This type of pitting mechanism comprises a pitting box having opposed side walls, each having an aperture therein. After the fruit and the contained pit have been split, the halves are clamped against the side walls with the pit halves positioned over the apertures. A substantially hemispherical pitting spoon is then swung into position on the opposite side of the wall and rotated so as to extend through the aperture and cut out the pit half.

Because of the variation in the size of various pits, considerable difficulty has been met in determining the proper size aperture and spoon to operate on pits of all sizes. In said application, there is described automatic mechanism for determining the magnitude of the cut made by the pitting spoon and other arrangements have also been developed. However, so long as the aperture size remains constant, the removal of the smaller pits often causes a breaking or tearing of the flesh surrounding the pit and the resulting fruit may thus not be sold as "choice" or "fancy" grades.

The present invention is designed to eliminate this difficulty by providing an adjustable aperture whose size is automatically determined by the size of the fruit half. This is accomplished by replacing a portion of the side of the pitting box against which the halved fruit is positioned for pitting with a sliding element, called a shear plate. This blade is normally held in its most forward position (forward, being defined as the direction toward the point where the pitting spoon enters the fruit) and which is automatically moved rearwardly as the spoon emerges from the fruit. This movement may be controlled, either by the spoon itself or its supporting mechanism, and maintains the shear plate just behind, but very close to, the spoon as it emerges from the fruit. Thus the flesh of the fruit just adjacent the emerging spoon is held solidly against the shear plate as the spoon emerges and is not destroyed or torn as the spoon removes the pit.

Thus, one of the objects of the invention is a device for pitting halved fruit in which the halved pits are easily and cleanly removed without damaging or tearing the flesh of the fruit surrounding the pits.

Another of the objects of the invention is a device for pitting halved fruit in which the fruit halves are placed over an apertured plate and means are provided for varying the size of said aperture depending upon the size of said fruit.

A further object of the invention is a device for pitting halved fruit in which the fruit halves are placed over an apertured plate for pitting and in which a slidable portion of said plate governing the size of said aperture is actuated during the pitting operation to support the flesh of the fruit adjacent the point of emergence of the pitting spoon.

And yet another object of the invention is a device for pitting halved fruit in which the fruit halves are placed over an apertured plate for pitting and in which a slidable portion of said plate governing the size of the aperture is actuated by the pitting spoon during the pitting operation.

In the drawings:

Figs. 5-A to 5-F are schematic views showing the relationships of the spoon and shear plates as the former revolves.

As will be seen below, the improvement described herein comprises a mechanism for varying the size of the pitting aperture during the pitting operation. Only the preferred form will be described in detail and shown in the drawings; but other and satisfactory constructions will be obvious to those skilled in the art and are intended to be covered by the claims.

The description of the present invention can best be understood by a reference to the drawings. The parts of the device numbered 401 et seq. will be fully described in detail. Those parts with smaller reference numerals will be generally described but are intended to refer to parts identical with those in the Herrer application identified above and which their detailed construction and operation is set forth.

In that application, the pitting box 271 is described as a fixed element with flat opposed sides having apertures as at 272. On top of the pitting box is a frame 192 mounted for swinging about a shaft 193 secured in a stationary frame 145 (only partially shown here). The pitting spoon shaft 191 is mounted in one end of frame 192 and carries the pitting spoon 194 at its lower end inside the pitting box 271. At the upper end of shaft 191 is a gear 205 which is designed to be driven by a chain of gears including idler gear 206 (mounted on a shaft 207 rotatably secured in frame 192) and gear 204 (mounted for free rotation on shaft 193). Thus rotation of the pitting spoon is accomplished, as is shown in said application, by driving gear 204 which transmits its rotation to said spoon through gears 206, 205.

The frame 192 is oscillated about shaft 193 by a link 190 secured freely around shaft 191 and only partially shown. By means of this link, the pitting spoon is oscillated back and forth to the two sides of the pitting box to pit the fruit halves held thereagainst (and over the apertures 272) by means of clamps 277. These clamps are held in place by arms 273 mounted to swing on shafts 276, all as described in said application.

Said application also discloses mechanism by which the pitting spoon 194 and its shaft 191 are positioned relative to the sides of the pitting box during the pitting operation, said position being determined by the size of the fruit in order that the spoon will cut into the fruit the proper distance to avoid and yet remove the pit. This is accomplished by regulating the amount of swing of frame 192 about shaft 193 as determined by the position of clamps 277 and clamping arms 273. This mechanism is not shown here except that links 275, made integral with arms 273 are partially indicated in the drawings. A full showing is unnecessary since the present invention is designed to operate whether or not such mechanism for regulating the depth of the pitting is used or not.

The present invention and improvement deals specifically with the construction of the pitting box 271. The shape of its sides 401 is improved by extending the apertures rearwardly from the pitting knife to the full length of said sides, said extension of the apertures being of the full height of the apertures, as can be seen in Fig. 1.

Figure 4:
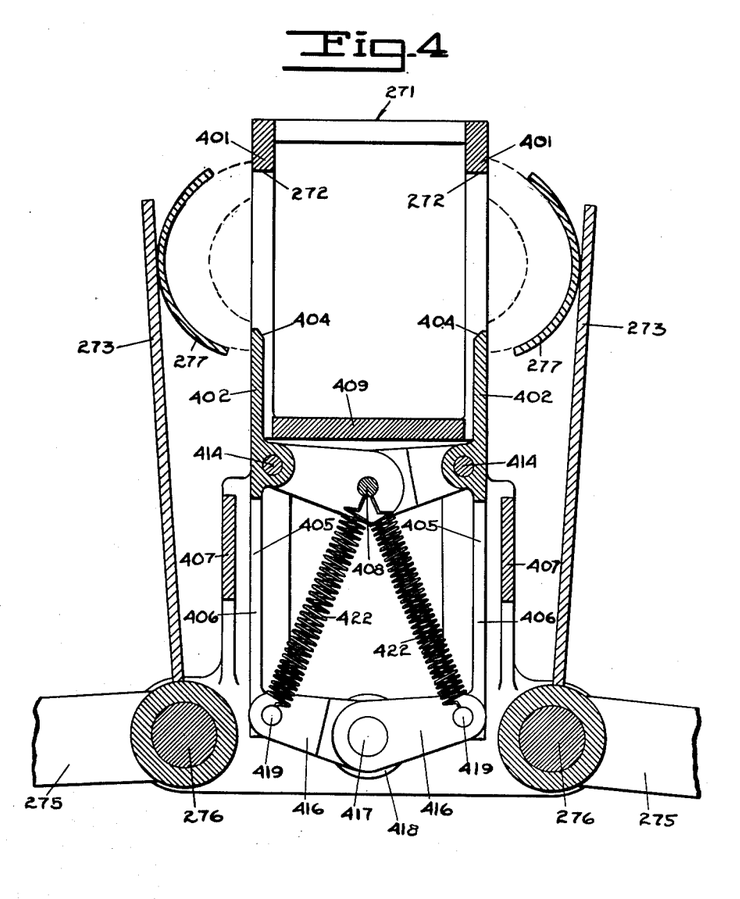
Fig. 4 is a sectional view along the line 4—4 of Fig. 1.

To replace the removed portion of the sides of the pitting box, there is provided a pair of shear plates, generally designated 402, one being positioned in conjunction with each side. Each shear plate is of the approximate height of the aperture and of a thickness equal to the wall 401. Its forward end is concavely curved, as can be seen in Fig. 1, as at 403, and is bevelled, as at 404 (Fig. 4).

Figure 1:
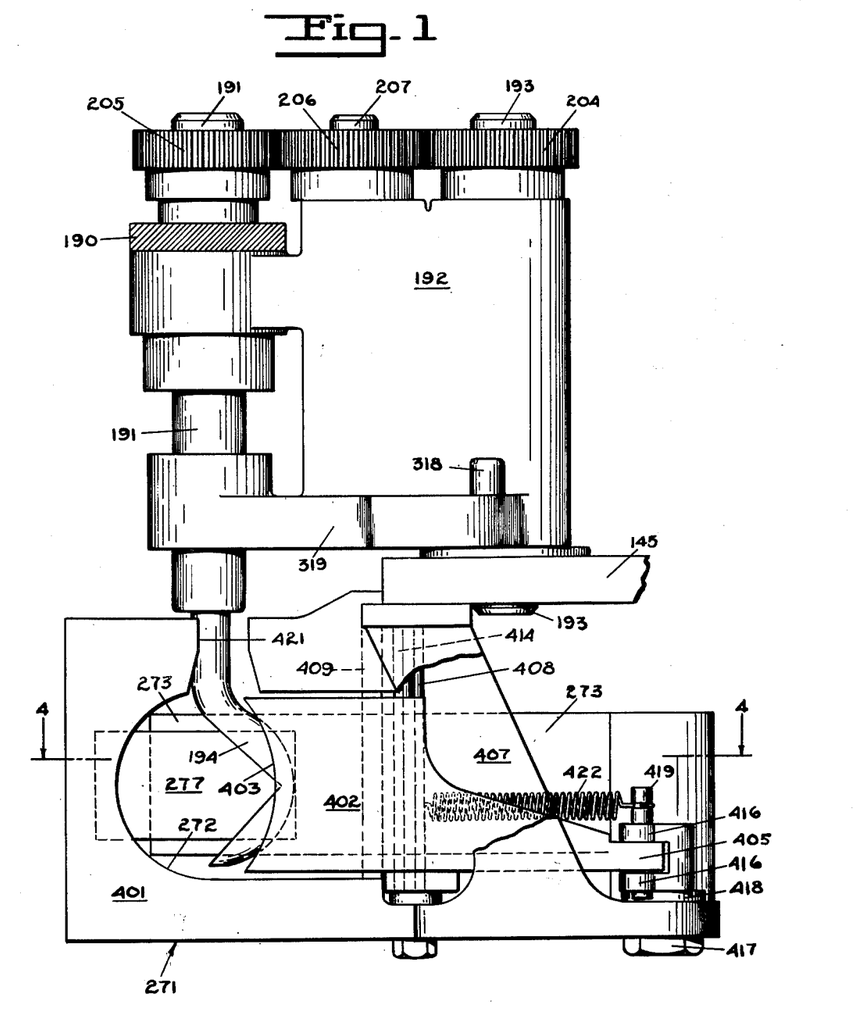
Fig. 1 is a side elevation of one form of the pitting mechanism with one of the fruit clamping members removed to show its details.

Each of the shear plates 402 is of full height, as can be seen in Fig. 1, for approximately half its length and is provided with a rearwardly extending arm 405, strengthened by means of a vertical web 406.

Figure 2:
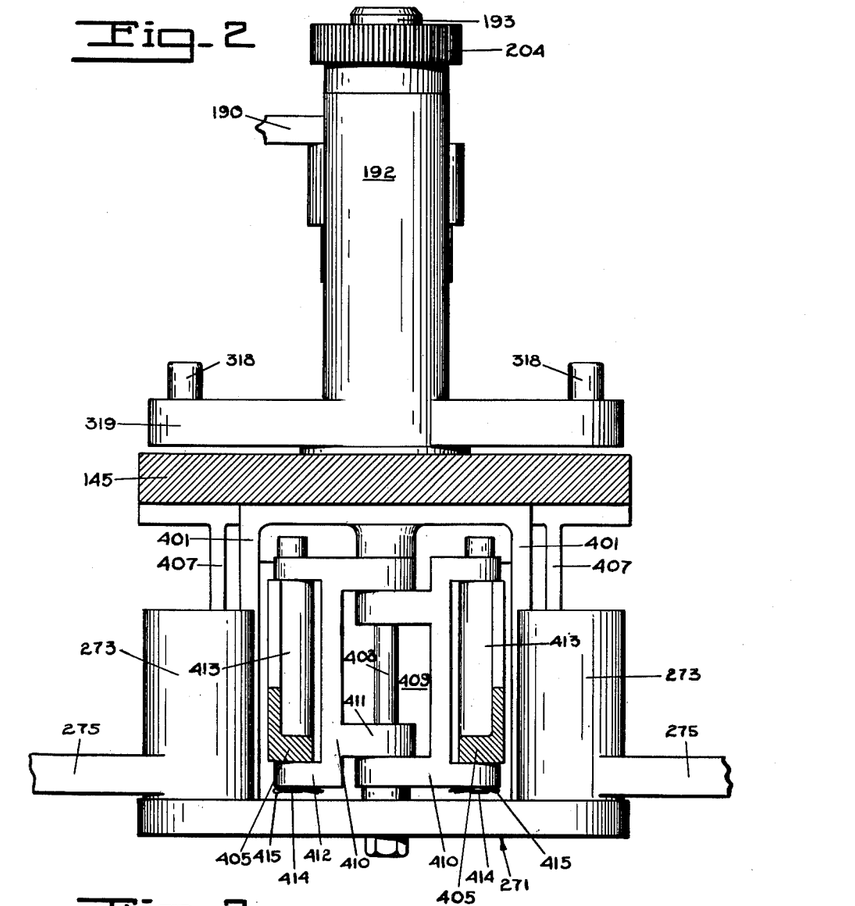
Fig. 2 is an end elevation of the mechanism shown in Fig. 1, with parts of the mounting for the shear plates removed.

As has been generally described, the shear plates 402 are arranged for horizontal movement, being adapted to be slid in the plane of the wall 401 toward and away from the forward portion of the aperture, as at 272. In order to mount the plates in the planes of the walls, the rearward ends of the latter are extended laterally in the form of a pair of slanting posts or supports 407. The primary support for each of the shear plates is provided by a vertical shaft 408 centrally positioned in the pitting box, just rearwardly of a transverse wall 409. This shaft is suitably secured into the bottom and top of the pitting box and supports a pair of hinge members 410. Each hinge comprises a pair of inwardly extending wings 411 drilled to receive the shaft 408 and a pair of outwardly extending wings 412 to support the associated shear plate. In order to accomplish the latter, each plate is provided with vertical boss 413 on its inner face, drilled to receive a pin 414. The outwardly extending wings 412 of the hinge member 410 are also drilled to receive pin 414, as can be seen in Figs. 2 and 4, the whole being secured by cotter pins 415. It may thus be seen that the shear plate 402 is permitted to slide horizontally, substantially in the plane of the wall, by virtue of the support provided by the hinge member 410 secured for free rotation on pin 408.

Figure 3:
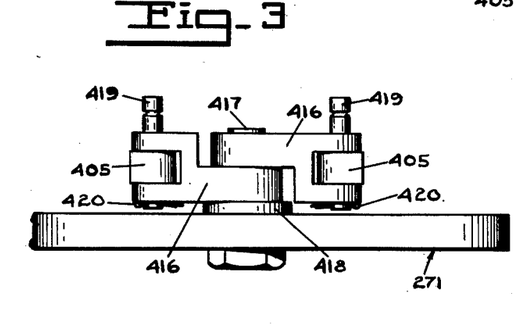
Fig. 3 is an end elevation of those parts of the mounting omitted from Fig. 2.

In addition to the support provided by pin 408, each of the rearwardly extending arms 405 of the shear plates 402 is supported for movement by a link 416 as seen in Figs. 1 and 3. The links are separated from the bottom by a washer 418 and their outer ends are forked to receive the arms 405. The forked ends of the links and the arms are drilled to receive pins 419, secured by cotter pins 420.

The sheer plates 402 are held in normal position by a pair of springs 422, each of which is secured at one end to pin 408 and at the other to one of the pins 419, as can be seen in Fig. 4. By virtue of these springs, the shear plates are held normally in their forward position, as illustrated in Figs. 1 and 4.

As has been described, the frame 192 and the pitting spoon 194 is oscillated about shaft 193 at the proper time, from one side of the pitting box 271 to the other, after the split halves of the fruit have been properly positioned against said sides and over the apertures 272 by the clamps 277. With the shear plates in their normal forward curved bevelled edge 404 overlies a part of the halved pit retained by the fruit. As the frame 192 is oscillated to bring the pitting knife into pitting position, the same is carried transversely until its shaft 191 lies partially in the plane of the side 401 and the shear plate 402, by virtue of the side having been cut out, as at 421, as can be seen in Fig. 1. As the pitting spoon begins its rotation (counter-clockwise at the lower position of Fig. 4) its forward edge cuts into the fruit half, indicated in dotted lines. As the spoon begins to emerge from the fruit, it slidably contacts the forward bevelled edge 404 of the shear plate 402 and, as it continues its rotation, forces the shear plate rearwardly until the spoon entirely emerges from the fruit. After emergence the springs 422 return the shear plates to their normal positions.

Although various types of curved pitting spoons may be used, the form shown is one which, in conjunction with the curved edge (as at 403) of the shear plate, contacts the plate at the points of emergence of the knife from the fruit half. This is an important feature inasmuch as the shear plate should overlie as much of the flesh of the fruit as is possible at all times during the pitting operation. In the form shown in the drawings, the spoon is substantially formed from the surface of a hemisphere with V-shaped notches formed in its trailing and leading edges. With this form, the curve of the apertured edge 403 is formed with a greater radius of curvature than is the curve of the spoon and with its center of curvature positioned somewhat forward of the center of curvature of the spoon. As a consequence, the spoon will first contact the edge 403 at upper and lower points along the curve, which contact points will slowly move together, as the spoon is rotated, until, as the mid portion (vertically) of the spoon emerges from the fruit, there will be a single, centrally positioned point of contact between the spoon and shear plate.

In this connection, the shape of the spoon 194 causes it to contact the shear plate while the latter is in its normal position. As the spoon rotates and as its diameter at the contact points increases, it forces the shear plates rearwardly until the plate is contacted by the spoon at its maximum central diameter. As rotation continues this contact diameter again decreases as the springs 429 cause the shear plates to move forwardly, during the latter part of the rotation, to their normal position.

Figures 5A, 5B:
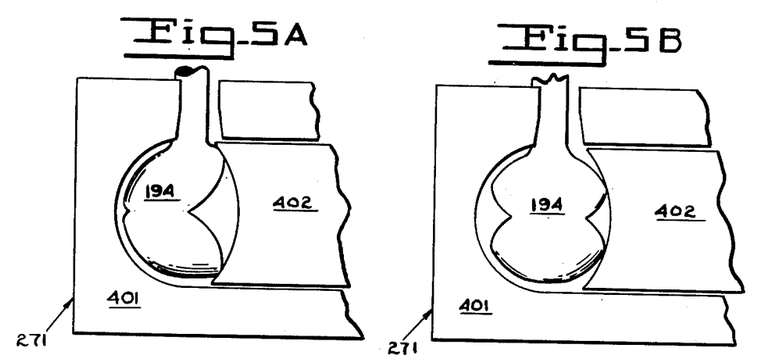
Figure 5C:
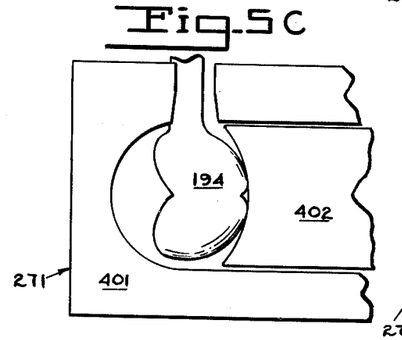
Figure 5D:
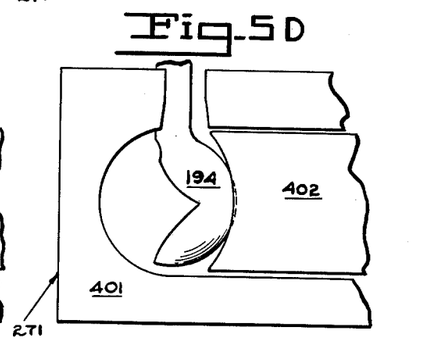
Figure 5E:
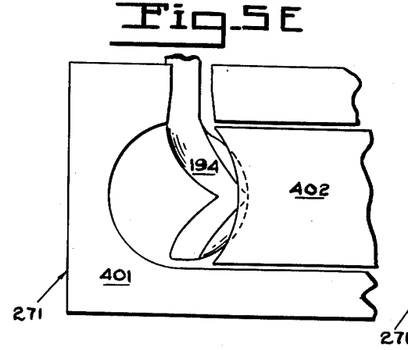
Figure 5F:
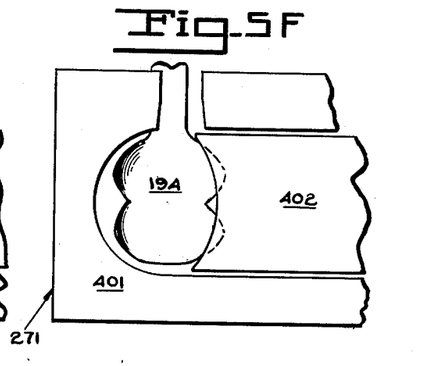

Figs. 5A-F illustrate the various positions of the shear 402 plate during rotation of the pitting spoon 194, the letter X indicating the points of contact. In Fig. 5A, the spoon has just contacted the shear plate at two points X, rather widely spaced. The shear plate is still in its normal forward position and has not yet moved. In Fig. 5B, the spoon has rotated slightly more, the shear plate has moved slightly rearwardly and the points of contact X has moved closer together. In Fig. 5C, the process has continued with the shear plate having almost reached its maximum point of travel, and the points of contact are very close together. In Fig. 5D, the spoon has completed half its rotation and now contacts the shear plate at only one middle point. In this view, the shear plate has reached its maximum rearward point, in which position it remains while the spoon rotates from a position where the point of the leading V-shaped edge emerges. Fig. 5E shows a position where the points of contact are again separating and the shear plate has begun its return to normal position. Fig. 5F shows the spoon out of contact with the plate, the latter having returned to its normal, forward position.

From these drawings it can be seen that the points of emergence of the spoon from the fruit are also the points of contact between fruit, plate, and spoon. The construction thus assures that the flesh of the fruit immediately adjacent the emerging spoon, and which is most likely to be torn and mutilated, is held solidly against the shear plate at all times.

Figure 6:
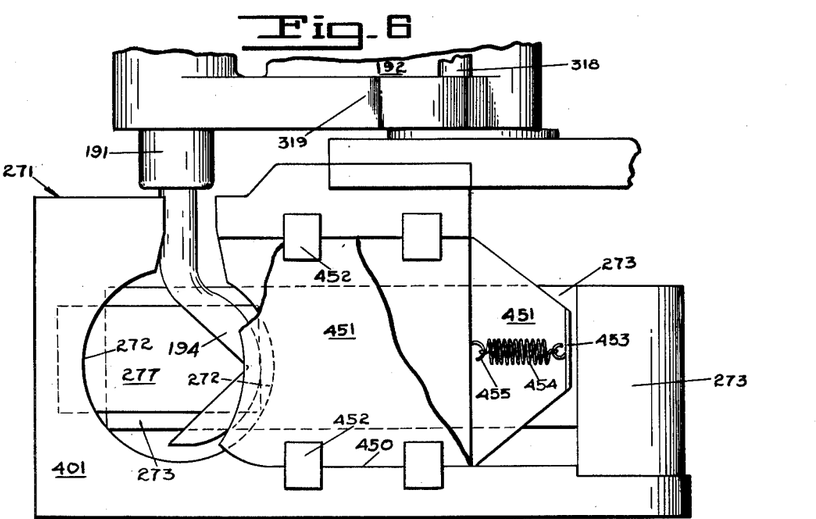
Fig. 6 is a side elevation of the pitting box showing alternative means for supporting the shear plates.
Figure 7:
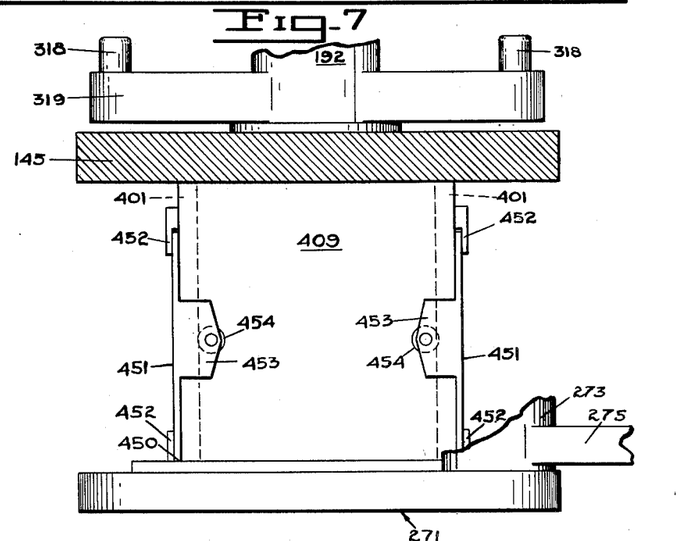
Fig. 7 is an end elevation of the form of pitting box shown in Fig. 6.

An alternative construction of the mounting for the shear plates is shown in Figs. 6 and 7. The various parts of this construction which bear similar reference numerals to the construction shown in Figs. 1-4 are identical with the parts there indicated.

In this construction the apertures 272 in the side walls 401 of the pitting box 271 are not carried rearwardly, but the sides extend rearwardly to the transverse wall 409. This wall is also moved somewhat rearwardly from that shown in Figs. 1 and 4. However, the sides 401 are slotted, as at 450, to provide a guideway for the shear plates 451 and a plurality of guides 452 are welded or otherwise attached along the edges of the slot to hold the shear plates in place within the guide ways. The rearward end of the shear plates are integrally formed with an inwardly positioned extension 453 in order that springs 454 may be secured between said extensions and pins 455 anchored in the transverse wall 409.

In operation, this form of shear plate acts as do the shear plates 402 in Figs. 1-4. It should be noted however that in this form it may be desirable to complete the aperture 272 so that in their normal position, the shear plates overhang the side walls 401 and extend slightly over the apertures, as shown in Fig. 6.

Figure 8:
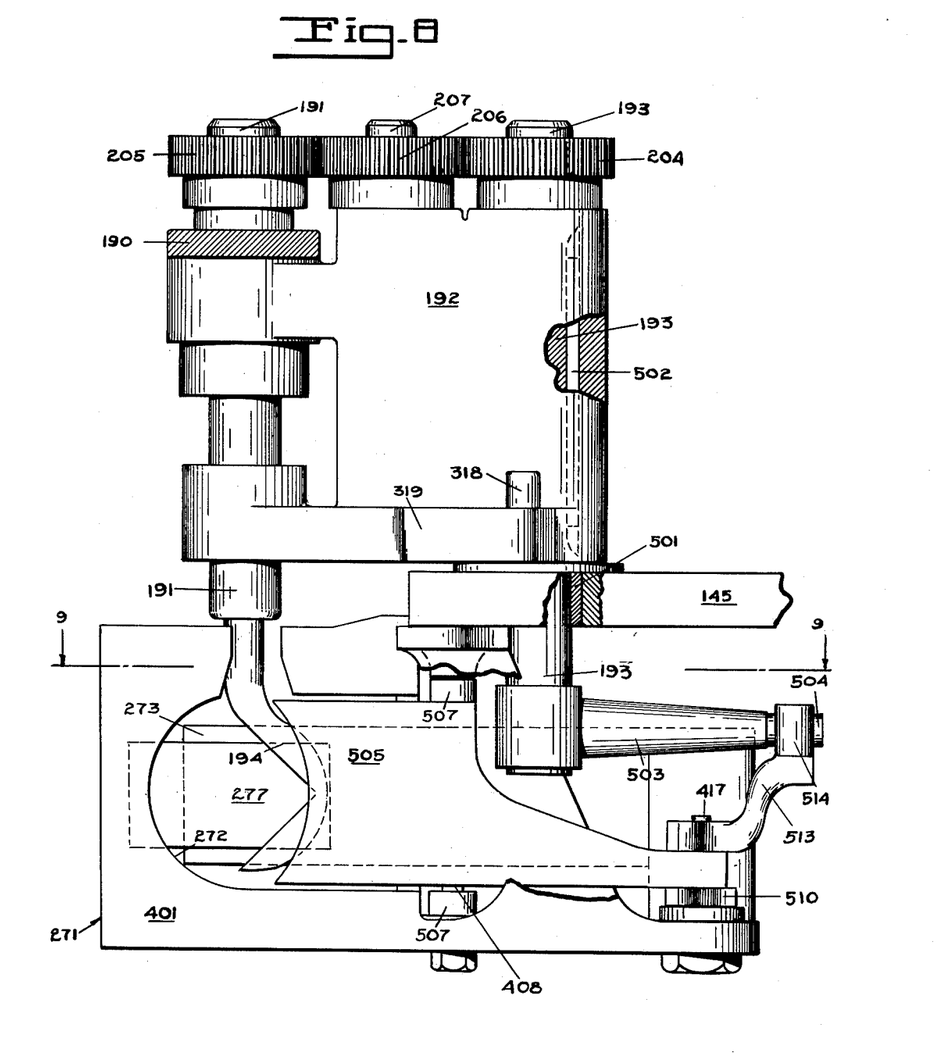
Fig. 8 is a side elevation of the pitting box showing still another alternative means for supporting the shear plates.
Figures 9, 10:
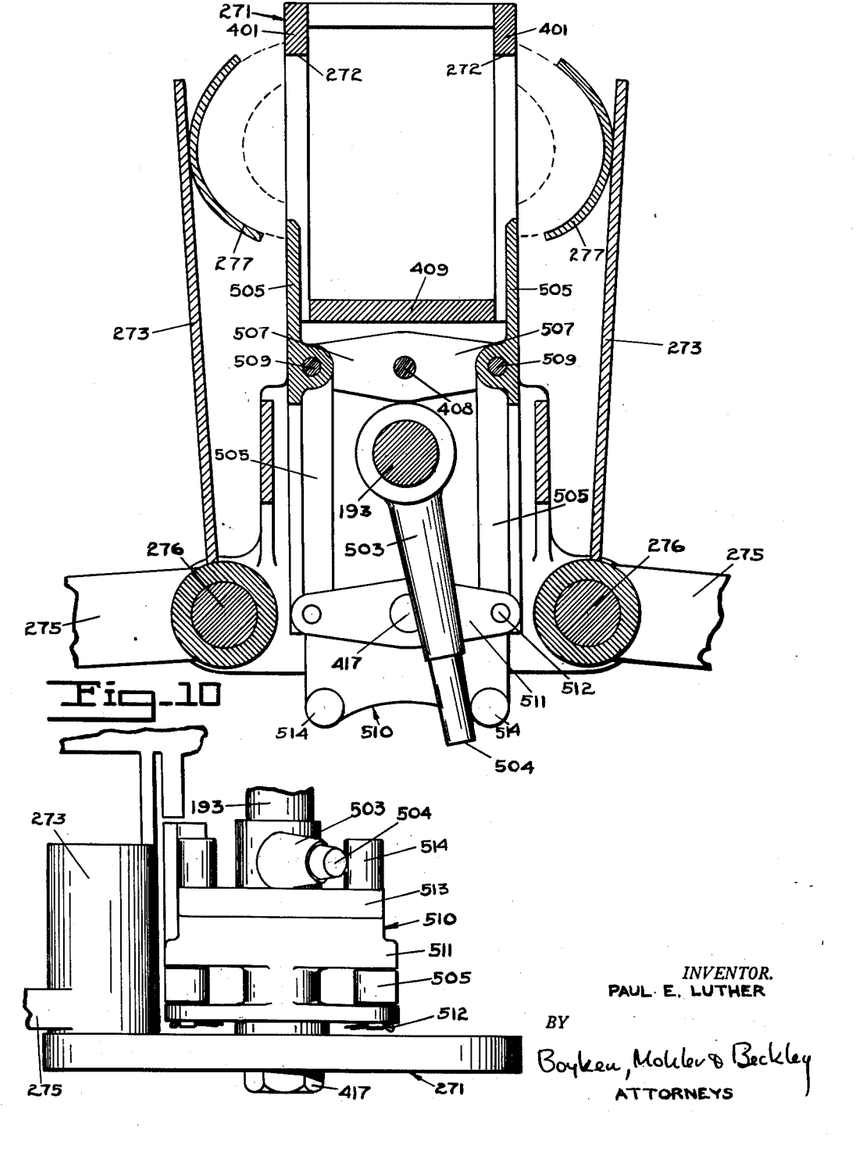
Fig. 9 is a sectional view along the line 9—9 of Fig. 8.
Fig. 10 is an end view of the pitting box shown in Fig. 8.

The alternative form of device shown in Figs. 8-10 is similar to that shown in Figs. 1-4 except that the movement of the shear plates is not controlled by direct contact with the pitting spoon. The differences are indicated below, but where identical reference numerals are used, the parts are the same as those shown in Figs. 1-4.

In this form, the stationary frame 145 is provided with a conventional bushing 501 in which the shaft 193 is supported for rotation. The shaft is then secured by means of a key 502 to the frame 192 in order that shaft 193 and frame 192 oscillate as a unit to carry the spoon 194 into pitting position. The lower end of shaft 193 extends through frame 145, as can be seen in Fig. 8, and an arm 503, having an extending pin 504, is secured to this lower end of the shaft, for a purpose to be described.

The shear plates 505 are supported at two points. One supporting member 506 is secured on shaft 408 and is provided with a pair of wings 507, one at the upper and one at the lower end of the shaft 408. Each wing extends sidewardly toward the shear plates 505 to support the latter. The shear plates are provided with inwardly extending bosses 508 and the bosses and wings 507 are drilled to receive pins 509.

The rearwardly extending ends of the shear plates are also supported by a bracket generally designated 510. The bracket is centrally pivoted on the pin 417 mounted in the base of the pitting box 271. Each end of the bracket is provided with ears 511 which support pins 512. The ends of the shear plates 505 are secured to pins 512 as may be seen in Figs. 8-10.

Bracket 510 is also provided with a pair of upstanding arms 513, each of which carries a vertical post 514, positioned to lie on opposite sides of the pin 504 attached to the oscillating arm 503. The pin 504 and posts 514 are so arranged that as frame 192 and shaft 193 oscillate to bring the pitting spoon 194 into position to remove the pit, arm 503 will rotate to bring pin 504 into contact with one of the posts 514. As oscillation continues, bracket 510 will be cause to rotate, forcing one of the shear plates forward and the other backward. The shear plate moving backward will thus be moved out of the way of the rotating pitting spoon 194. Likewise, when the pitting spoon is carried to the other side of the pitting box, the movement of the shear plates will be reversed. If desired, suitable spring means may be secured to bracket 510 to return it to its central, normal position when pin 504 is out of contact with posts 514.

In the normal position of the shear plates, as shown in Fig. 8, the pitting spoon would contact the shear plates as the former rotated. The component parts of the above mechanism are so arranged that the shear plate in contact with the fruit half being pitted, will be moved rearwardly just enough so that the pitting spoon will clear the same when it emerges from the fruit.

I claim:

1. In a device for pitting fruit and the like: a flat support, having an aperture therein, adapted to be engaged by the flat cut face of a fruit half having the pit half therein with said pit half exposed in said aperture; a pitting curved knife positioned to rotate through said aperture for removing said pit half from said fruit half; said support including a member defining a side of said aperture supported for movement substantially in the plane of said support toward and away from the opposite side of said aperture and into engagement with said knife during said rotation of said knife for restricting the size of said aperture to substantially the path defined by said knife; means, including said pitting knife and a spring for yieldably holding the aperture defining edge of said member in engagement with said knife; the portion of the support defining the edge of said aperture opposite said member being of substantially the same contour as said knife and positioned for passage of said knife there past in close relation thereto prior to movement of said knife past said member, and the contour of said aperture defining edge of said member substantially corresponding to the contour of said knife, for causing said movement.

2. In a device for pitting fruit and the like: a pair of spaced stationary supports, each having an aperture therein and each adapted to be engaged by a respective one of the flat cut faces of a pair of fruit halves each of said halves having a pit half therein with each of said pit halves exposed in a respective one of said apertures in said supports; a pitting device positioned between said supports and positioned to rotate through said apertures for removing said pit halves from said fruit halves; each of said supports including a member defining a side of the aperture therein supported for movement substantially in the plane of said support toward and away from the opposite side of the aperture therein during said rotation of said device; means connected with each member for yieldably holding the aperture defining edge thereof in engagement with said device during movement of said device therepast in its rotation whereby said device will space the aperture defining edge of each member from the side of the aperture opposite thereto during said engagement.

3. In a device for pitting fruit and the like: a pair of spaced stationary supports, each having an aperture therein and each adapted to be engaged by a respective one of the flat cut faces of a pair of fruit halves each of said halves having a pit half therein with each of said pit halves exposed in a respective one of said apertures in said supports; a pitting device positioned between said supports and positioned to rotate through said apertures for removing said pit halves from said fruit halves; each of said supports including a member defining a side of the aperture therein supported for movement substantially in the plane of said support toward and away from the opposite side of the aperture therein during said rotation of said device; said device having a convexly curved surface adapted to engage the aperture defining edge of each of said members during the final movement of said device through each aperture, and means for yieldably holding each of said members with its said aperture defining edge in engagement with said curved surface during said final movement of said device through each aperture.

4. A pitting mechanism for drupe halves comprising; a pair of coplanar flat members against one side of which the flat cut face of a drupe half is adapted to be positioned, said members being formed with opposed curved edges defining the outline of an aperture through which the pit of a drupe half is exposed when such half is so positioned against said members, one member of said pair being movable toward and away from the other member at said aperture for varying the distance between said opposed edges, a curved pitting knife at one side of said aperture supported for revolution past the aperture defining edge of said other member into said aperture and out of said aperture past the aperture defining edge of said one member with the curved portion of said knife generally following the curve of said aperture defining edges during said movement therepast, means for yieldably urging said other of said members toward said one member at all times and to a position in which its aperture defining edge is substantially in engagement with said knife during movement of said knife therepast whereby the support afforded by said one member for said drupe will be unaffected by said movement of said other member during a pitting operation.

5. A pitting mechanism for drupe halves comprising; a pair of coplanar flat members against one side of which the flat cut face of a drupe half is adapted to be positioned, said members being formed with opposed curved edges defining the outline of an aperture through which the pit of a drupe half is exposed when such half is so positioned against said members, one member of said pair being movable toward and away from the other member at said aperture for varying the distance between said opposed edges, a curved pitting knife at one side of said aperture supported for revolution past the aperture defining edge of said other member into said aperture and out of said aperture past the aperture defining edge of said one member with the curved portion of said knife generally following the curve of said aperture defining edges during said movement therepast, means for yieldably urging said other member toward said one member and to a position with its aperture defining edge in engagement with the convex side of said knife during said movement of said knife therepast.

PAUL E. LUTHER.

REFERENCES CITED

The following references are of record in the file of this patent:

UNITED STATES PATENTS

| Number | Name | Date |
|---|---|---|
| 1,785,021 | Whipple | Dec. 16, 1930 |
| 2,026,806 | Thompson | Jan. 7, 1936 |
| 2,226,664 | Jepson | Dec. 31, 1940 |
| 2,257,341 | Jepson | Sept. 30, 1941 |

FOREIGN PATENTS

| Number | Country | Date |
|---|---|---|
| 112,506 | Australia | Feb. 6, 1941 |
| 114,460 | Australia | Jan. 15, 1942 |